United States Patent
Innes et al.

(10) Patent No.: US 12,410,659 B2
(45) Date of Patent: Sep. 9, 2025

(54) METHOD AND SYSTEM FOR CONTROLLING A PLURALITY OF DRILL RIGS

(71) Applicant: TECHNOLOGICAL RESOURCES PTY LIMITED, Melbourne (AU)

(72) Inventors: Chris Innes, Melbourne (AU); Benjamin Jones, Melbourne (AU); Steven Cook, Melbourne (AU); Joshua Leeman, Melbourne (AU)

(73) Assignee: TECHNOLOGICAL RESOURCES PTY LIMITED, Melbourne (AU)

( * ) Notice: Subject to any disclaimer, the term of this patent is extended or adjusted under 35 U.S.C. 154(b) by 0 days.

(21) Appl. No.: 17/926,841

(22) PCT Filed: May 29, 2020

(86) PCT No.: PCT/AU2020/050553
§ 371 (c)(1),
(2) Date: Nov. 21, 2022

(87) PCT Pub. No.: WO2021/237266
PCT Pub. Date: Dec. 2, 2021

(65) Prior Publication Data
US 2023/0203891 A1    Jun. 29, 2023

(51) Int. Cl.
*E21B 44/00* (2006.01)
*E21B 7/02* (2006.01)
(Continued)

(52) U.S. Cl.
CPC .......... *E21B 7/022* (2013.01); *E21B 41/0021* (2013.01); *E21B 44/005* (2013.01); *E21C 41/26* (2013.01); *E21C 47/10* (2013.01)

(58) Field of Classification Search
CPC ................. E21B 44/00; E21C 41/26
See application file for complete search history.

(56) References Cited

U.S. PATENT DOCUMENTS

| | | | | |
|---|---|---|---|---|
| 4,875,530 A | * | 10/1989 | Frink | .......... E21B 19/084 |
| | | | | 254/377 |
| 8,121,971 B2 | * | 2/2012 | Edwards | .......... E21B 44/00 |
| | | | | 706/50 |

(Continued)

FOREIGN PATENT DOCUMENTS

| | | |
|---|---|---|
| AU | 2013227999 A1 | 3/2014 |
| AU | 2022215227 A1 | 9/2022 |

(Continued)

OTHER PUBLICATIONS

Jul. 13, 2020—(WO) International Search Report and Written Opinion—App. No. PCT/AU2020/050553—10 pages.

(Continued)

*Primary Examiner* — Kenneth L Thompson
(74) *Attorney, Agent, or Firm* — Banner & Witcoff, Ltd.

(57) ABSTRACT

Disclosed herein are a control method and system. The system includes: a deactivation control; a control centre controller for storing an association between the deactivation control and a selected set of mine sites; a plurality of autonomous drill rigs, each drill rig having a drill shutdown module to disable a function of the respective drill rig upon receipt of a deactivation command; and a mine site controller associated with each mine site, each mine site controller being coupled to all autonomous drill rigs located at the respective mine site with which the mine site controller is associated. Activating the deactivation control transmits a deactivation command from the deactivation control to the control centre controller. The control centre controller forwards the deactivation command to a mine site controller associated with each mine site in the set of mine sites for distribution to all autonomous drill rigs at that mine site.

13 Claims, 8 Drawing Sheets

(51) Int. Cl.
  *E21B 41/00* (2006.01)
  *E21C 41/26* (2006.01)
  *E21C 47/10* (2006.01)

(56) References Cited

U.S. PATENT DOCUMENTS

| | | | |
|---|---|---|---|
| 8,145,462 B2 * | 3/2012 | Foucault | E21B 44/00 |
| | | | 702/9 |
| 8,332,153 B2 * | 12/2012 | Aamodt | E21B 44/00 |
| | | | 702/9 |
| 8,836,534 B2 * | 9/2014 | Field | E21B 7/022 |
| | | | 340/853.2 |
| 9,146,553 B2 | 9/2015 | Nettleton et al. | |
| 9,163,497 B2 * | 10/2015 | Laing | E21B 47/047 |
| 9,175,557 B2 | 11/2015 | Iversen et al. | |
| 9,957,781 B2 * | 5/2018 | Vennelakanti | E21B 43/00 |
| 10,301,923 B2 * | 5/2019 | Andresen | E21B 44/00 |
| 11,168,564 B2 * | 11/2021 | Lundh | G06F 9/4881 |
| 11,275,488 B2 * | 3/2022 | Bettles | G06N 20/20 |
| 2016/0314421 A1 * | 10/2016 | Watkins | G06Q 10/06313 |
| 2019/0043141 A1 * | 2/2019 | Lundh | G06Q 50/02 |
| 2019/0078429 A1 | 3/2019 | Zheng et al. | |
| 2019/0302723 A1 | 10/2019 | Rojas et al. | |
| 2021/0040820 A1 | 2/2021 | Jorud | |
| 2021/0232137 A1 | 7/2021 | Whitfield, Jr. et al. | |
| 2022/0042410 A1 * | 2/2022 | Doughty | G01V 1/288 |
| 2022/0235645 A1 * | 7/2022 | Madasu | E21B 44/02 |

FOREIGN PATENT DOCUMENTS

| | | |
|---|---|---|
| CL | 2011002714 A1 | 1/2012 |
| NO | 341369 B1 | 10/2017 |
| WO | 2015/121634 A1 | 8/2015 |

OTHER PUBLICATIONS

May 2, 2022—(WO) IPRP for PCT/AU2020/050553—20 pages.
Jun. 19, 2023—(CL) Opposition Filing—App 202203309.
Nov. 7, 2024—(CL) Examiner's Report—App 202203309.

* cited by examiner

METHOD AND SYSTEM FOR CONTROLLING A PLURALITY OF DRILL RIGS

CROSS-REFERENCE TO RELATED APPLICATIONS

This application is a U.S. National Stage application under 35 U.S.C. § 371 of International Application PCT/AU2020/050553 (published as WO 2021/237266 A1), filed on May 29, 2020. The prior application is hereby incorporated by reference in its entirety.

TECHNICAL FIELD

The present disclosure relates to a method and system for contemporaneously controlling multiple vehicles located at multiple sites. In particular, the present disclosure relates to a method and system for controlling, from a single control centre, multiple blast hole drill rigs located at multiple mine sites.

BACKGROUND

Surface mines extract ore by blasting areas of rock. Each area that is to be blasted is called a bench. In order to blast a bench, which is generally level, a mining engineer, also referred to as a drill and blast engineer, designs a blast for that bench. The designed blast takes into account many factors, including, but not limited to, access to the bench, the geology of the rock to be blasted, the drill rigs available for use, and type and quantity of explosives to be used. The mining engineer designs a drilling plan, also known as a drill pattern, which identifies the hole locations, hole sizes, and hole depths of the blast holes that are to be drilled by the drill rigs.

Once approved by the drill and blast engineer, the drilling plan is typically printed and handed to a team of drill operators assigned to an area of the bench to work on. It is common for two or three operator-controlled drill rigs to work contemporaneously on the same bench. The drill operators generally divide the bench area among themselves and then drill the holes in accordance with the drilling plan.

Once the drill rigs have drilled the holes, the holes are then filled with explosives by an explosives team and the explosives are detonated. The amount and type of explosive used for each blast is decided by the drill and blast engineer. The rubble produced by the blast is then collected by shovels and loaded into a fleet of dump trucks, which remove the rubble from the blast site to a processing plant. The rubble is a mixture of overburden and ore and the processing plant separates the ore from the overburden.

Mine sites operate with many pieces of heavy, industrial equipment, along with the frequent use of explosives. Further, surface mines often feature significant changes in elevation from one area of a mine to another, often without guard rails or the like. Consequently, safety is very important to the operation of a mine site and mines typically operate with stringent operating and safety protocols. Despite such safety protocols, situations arise in which lives and equipment are put at risk, due to human error, natural forces, and unforeseen circumstances.

As indicated above, it is common for two or more drill rigs to operate on a single bench. Operating multiple drill rigs on a single bench requires the drill rigs to avoid each other. Each drill rig also needs to avoid any blast holes that have already been drilled, in order to prevent collapsing those holes. Collapsing a hole requires the hole to be re-drilled and the collar of the hole may lose its integrity, resulting in a sub-optimal blast for that blast hole. Further, having multiple drill rigs operating on a single bench can present difficulties for other vehicles and personnel that need to access the bench, such as safety inspectors, and blast teams.

Communication between drill operators can also be difficult, due to the noise associated with the drilling and associated mine activities. Consequently, there is often a degree of latency involved before drill operators act on instructions received from a drill supervisor, generally by radio. This can result in different drill rigs responding to instructions at different times, with potentially hazardous results.

Thus, there is a need to provide a system that improves control of drill rigs on a mine site.

SUMMARY

The present disclosure relates to a method and system for controlling mining drill rigs that are operating in an autonomous mode, in order to disable operation of those mining drill rigs at the press of a button.

A first aspect of the present disclosure provides a control system, comprising:
  a deactivation control;
  a control centre controller coupled to said deactivation control and storing an association between said deactivation control and a selected set of mine sites;
  a plurality of autonomous drill rigs, each drill rig having a drill shutdown module adapted to disable a function of the respective drill rig upon receipt of a deactivation command; and
  a mine site controller associated with each mine site in said selected set of mine sites, each said mine site controller being coupled to all autonomous drill rigs located at the respective mine site with which the mine site controller is associated;
  wherein activating said deactivation control transmits a deactivation command from said deactivation control to said control centre controller and said control centre controller forwards the deactivation command to a mine site controller associated with each mine site in said set of mine sites for distribution to all of the autonomous drill rigs at that mine site.

A second aspect of the present disclosure provides a method for controlling a set of autonomous drill rigs, each autonomous drill rig having a drill shutdown module adapted to disable a function of the respective drill rig upon receipt of a deactivation command, the method comprising the steps of:
  selecting a set of mine sites to be associated with a deactivation control;
  storing said association between said deactivation control and said set of mine sites at a control centre controller;
  restricting selection of drill rigs by a drill control station coupled to said deactivation control to drill rigs located at said set of mine sites;
  sending a deactivation control to said control centre controller, upon activation of said deactivation control; and
  the control centre controller transmitting the deactivation command to all drill rigs located at all mine sites in said set of mine sites, wherein the drill shutdown module on each drill rig disables a function of said respective drill rig on receipt of said deactivation command.

A third aspect of the present disclosure provides a control system that includes:
- a plurality of autonomous drill rigs, each drill including:
  - a wireless receiver for coupling the respective drill rig to a wireless communications network for receiving control signals, and
  - a drill shutdown module for effecting shutoff of power to the drill rig;
- a remote control centre coupled to the wireless communications network, the remote control centre including:
  - an interface for selecting a set of the plurality of autonomous drill rigs to be controlled by a drill controller, and
  - a deactivation control adapted to send, when activated, a shutdown command to each drill in the selected set of autonomous drill rigs;
- wherein when each drill rig in the selected set of drill rigs receives the shutdown command, the drill shutdown module shuts off power to the drill rig.

In one arrangement, the drill shutdown module includes a switch coupled to the ignition of the drill rig.

In one arrangement, the drill shutdown module is adapted to cut fuel supply to the drill rig.

In one arrangement, the deactivation control includes an electromechanical switch coupled to the communications network.

In one arrangement, the deactivation control is a region on a display of a computing device adapted to receive a user input, the user input being selected from the group consisting of: mouse button click, keyboard input, and touch screen gesture.

In one arrangement, the plurality of autonomous drill rigs are located at multiple mine sites.

A fourth aspect of the present disclosure provides a method for effecting a shutdown of a set of autonomous drill rigs, wherein each autonomous drill rig includes a drill shutdown module adapted to shut off power to the respective drill rig, comprising the steps of:
- allocating the set of autonomous drill rigs to a deactivation control associated with a drill control station, the drill control station being coupled to each of said autonomous drill rigs via a communications network,
- wherein activating said deactivation control sends a shutdown signal from said drill control station, via said communications network, to the drill shutdown module on each autonomous drill rig in said set of autonomous drill rigs, and
- further wherein each drill shutdown module shuts down power to the respective drill rig, on receipt of the shutdown signal.

According to another aspect, the present disclosure provides an apparatus for implementing any one of the aforementioned methods.

According to another aspect, the present disclosure provides a computer program product including a computer readable medium having recorded thereon a computer program that when executed on a processor of a computer implements any one of the methods described above.

Other aspects of the present disclosure are also provided.

BRIEF DESCRIPTION OF THE DRAWINGS

One or more embodiments of the present disclosure will now be described by way of specific example(s) with reference to the accompanying drawings, in which.

Method steps or features in the accompanying drawings that have the same reference numerals are to be considered to have the same function(s) or operation(s), unless the contrary intention is expressed or implied.

DETAILED DESCRIPTION

Figure 1:
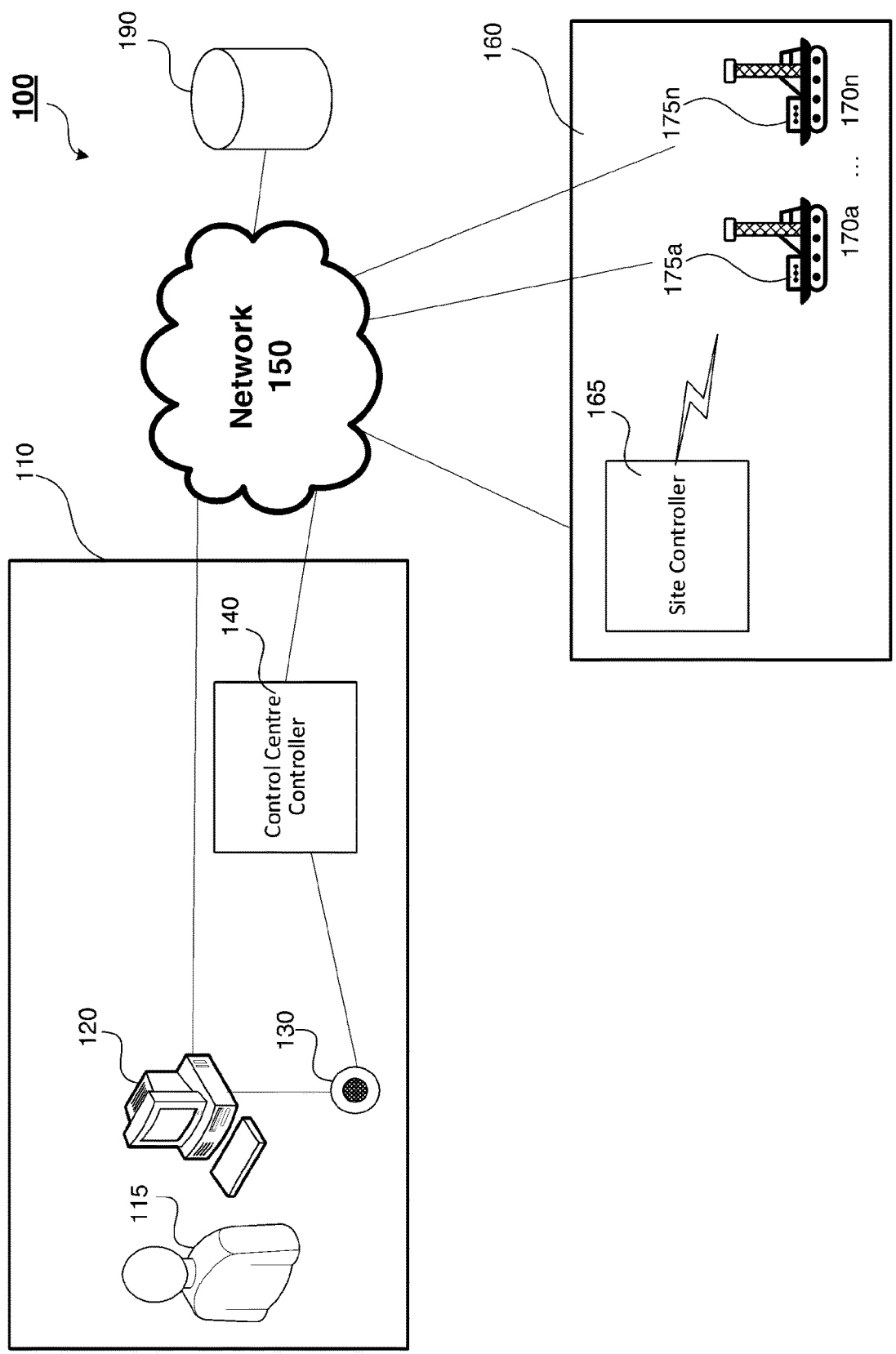
FIG. 1 is a schematic representation of a system on which one or more embodiments of the present disclosure may be practised.

The present disclosure provides a method and control system that utilise a remote control centre to control multiple vehicles at one or more sites. In particular, the system may be utilised to control mining drill rigs that are operating in an autonomous mode, in order to disable operation of those mining drill rigs at the press of a button.

A control system in accordance with the present disclosure is adapted to control a set of autonomous drill rigs, wherein each drill rig is equipped with a drill shutdown module that is capable of disabling at least one function of the drill rig. Depending on the implementation, disabling at least one function of the drill rig may include, for example, but is not limited to, one or more of: shutting down power to an engine of the drill rig; cutting off a fuel supply; electrical disabling of an engine control module; or disabling a drilling function or mode of the drill rig. Shutting down power to an engine of the drill rig may be achieved in different ways, including, but not limited to, fuel supply cut-off, electrical cut-off of an engine control module, activation of an emergency stop (e-stop) system provided as part of the base original equipment manufacturer (OEM) specification of the drill rig, via e-stop input to an OEM engine shutdown input, or any combination thereof. The manner in which the drill shutdown module is implemented depends on the application and the function of the drill rig that is to be disabled upon activation. Some embodiments implement the drill shutdown module utilising a computer, such as a programmable logic controller programmed to shut down or inhibit operation of a function of a drill rig on receipt of a deactivation command.

The control system includes a remote control centre for controlling operation of one or more drill rigs at one or more mine sites. The remote control centre includes a drill control station to be operated by a drill controller. The drill control station may be implemented using a computer on which is executing software for remotely controlling one or more autonomous drill rigs. The drill control station includes a display on which the drill operator is able to view data relating to one or more drill rigs assigned to that drill control station. Depending on the implementation, the drill control station optionally includes capabilities to view video transmitted from one or more mine sites, as well as monitoring and diagnostic tools. The drill control station is adapted to transmit information and instructions to each drill rig, via a wireless communications network.

Autonomous drill rigs are drill rigs that have been configured to perform one or more functions based on received computer commands, without requiring input from an onboard drill operator. The functions able to be performed autonomously may include, for example, but are not limited to, tramming from one location to another, levelling by extending jacks, drilling, and retracting jacks. Autonomous drill rigs may have been designed and constructed from the ground up to perform one or more autonomous functions. Alternatively, such autonomous drill rigs may be conventional blast hole drill rigs that have been retrofitted with automation technology that enable the drills to perform one or more autonomous functions. Autonomous drill rigs are monitored and controlled by a supervisory system, such as the remote control centre mentioned above.

The remote control centre controls the operation of drill rigs at one or more mine sites allocated to that remote control centre. The remote control centre is coupled to a communications network and sends information and commands via the communications network to drill rigs at a mine site, wherein each drill rig is equipped with a wireless receiver for coupling the drill rig to the communications network.

A drill controller can access the drill control station to select a set of drill rigs to be controlled by that drill control station. In some embodiments, the drill control station provides a user interface by which a drill controller can select a set of drill rigs to be controlled by that drill control station. Depending on the implementation, the user interface enables the drill controller to select the drill rigs on an individual basis or based on a mine site at which the drill rigs are located or based on a combination thereof.

Figure 6:
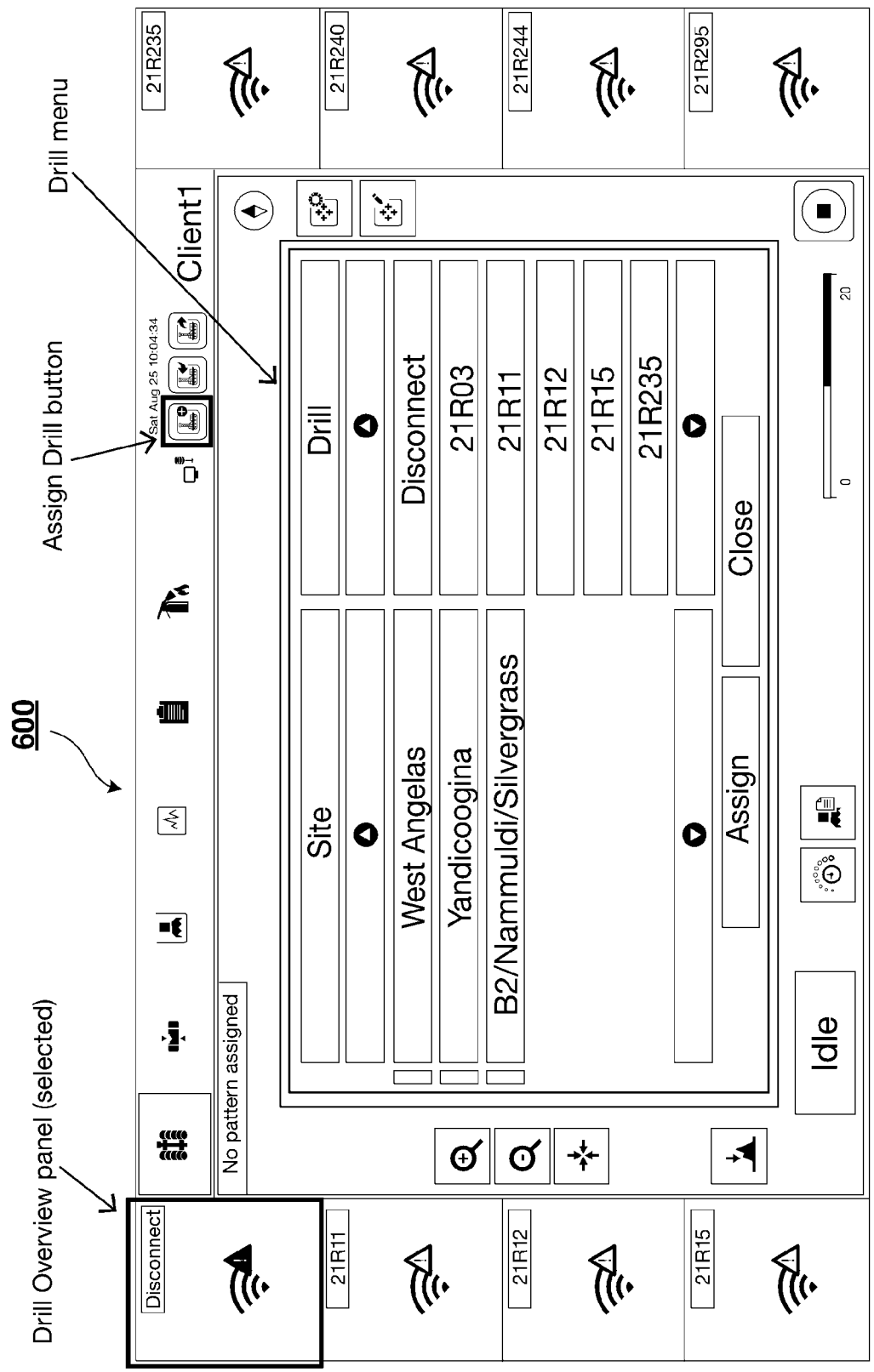
FIG. 6 is a screen shot of a user interface for assigning drill rigs to a drill control station.

In one scenario, when commencing work for a shift, a drill controller must first select one or more sites that are to be controlled by the drill controller for that shift. FIG. 6 is a screen shot of a user interface 600 displayed on a display of a drill control station by which a drill controller can select a set of autonomous drill rigs to be controlled by that drill control station.

In the example of FIG. 6, the user interface 600 displays a set of three mine sites to which the drill control station is coupled: West Angelas, Yandicoogina, and Nammuldi. In this case, the drill controller selects mine site West Angelas, which causes the user interface to display all drill rigs available at the selected mine site. Depending on the implementation, the drill controller is able to select a sub-set of drills to be controlled, from one or more available mine sites. In other implementations, the drill controller is able to select a mine site and all autonomous drill rigs at the selected mine site are automatically under the control of that drill control station. In further implementations, the user interface 600 provides the drill controller with the ability to select regions of mine sites and automatically control autonomous drill rigs in the selected region(s).

In some embodiments, the drill control station is associated with a deactivation control that is adapted to send, when activated, a shutdown command to all drill rigs at sites for which that drill control station is controlling at least one drill rig. The deactivation control may be integral with or co-located with the drill control station. For example, a drill controller accesses a user interface of the drill control station and selects two drill rigs at a first mine site and three drill rigs at a second mine site to control. When the drill controller activates the deactivation control associated with the drill control station, the deactivation control sends a shutdown command to all drill rigs at the first mine site and the second mine site, as the drill control station has at least one drill rig under control at each of the first and second mine sites. This functionality enables a drill controller to effect a shutdown of not only the drill rigs under control of the drill controller, but all drill rigs at the sites for which the drill controller is controlling at least one drill rig. The ability to effect site-wide shutdown provides an important safety feature to protect personnel and equipment operating on the affected sites.

In some embodiments, the deactivation control is implemented using a computing device, such as a programmable logic controller (PLC) with a display screen. The deactivation control provides a user with a user interface by which to select one or more drill rigs that are to be controlled. In some implementations, the user interface initially provides the drill controller with a set of mine sites. The drill controller selects a mine site and then is either in control of all drill rigs at that mine site or is able to select a set of drill rigs from that mine site to control, depending on the particular implementation. When the drill controller selects one or more mine sites, or a drill rig associated with a mine site, the programmable logic controller associates the deactivation control with all mine sites that have been selected. In an alternative embodiment, the programmable logic controller sends an association between the deactivation control and all selected mine sites to a control centre controller. In a further alternative embodiment, the deactivation control is integral with the drill control station and the drill control station stores the association of the deactivation control with the selected mine site(s). When activated, the deactivation control sends a shutdown message to all of the mine sites associated with that deactivation control.

In some embodiments, the drill controller must first access the deactivation control to select one or more mine sites or a set of drill rigs associated with one or more sites before being able to operate the drill control station. This ensures that the deactivation control is active for a site before any control of drill rigs on a site can occur.

In some embodiments, the drill control station includes a deactivation control that is adapted to send, when activated, a shutdown command to each drill rig in a selected set of drill rigs corresponding to the drill rigs being controlled by that drill control station. Depending on the implementation, the deactivation control may be integral with the drill control station or co-located with the drill control station.

The shutdown command relates to disabling or inhibiting at least one function on each drill rig to which the command is sent. When a drill shutdown module on a drill rig receives the shutdown command, the drill shutdown module disables or inhibits a function on that drill rig, such as by shutting off power to the drill rig. Thus, the control system enables a drill controller accessing the drill control station to send a shutdown command to all drill rigs being controlled by that drill control station, or to all drill rigs at all mine sites for which the drill control station has control of at least one drill rig, by activating a single control in the form of the deactivation control.

In some embodiments, a drill control station may be controlling a set of drill rigs spanning multiple mine sites, such that a deactivation control associated with that drill control station may activate shutdown across multiple mine sites to each drill rig in the set of drill rigs. In such embodiments, the drill control station provides an interface that enables the drill controller to select a set of drill rigs from one or more mine sites for control by that drill control station and automatically associates the set of selected drill rigs with the deactivation control. In further embodiments, a set of drill rigs may correspond to a region of a mine site, such that multiple sets of drill rigs may be located at a single mine site. In such embodiments, the drill control station optionally provides the drill controller with the option of selecting from one or more designated regions of a mine site and automatically associates all drill rigs located in a selected region with the drill control station and its associated deactivation control.

The drill shutdown module attached to each drill rig is adapted to inhibit or disable at least one function of the drill rig to which the drill shutdown module is attached. In one scenario, the drill shutdown module is configured to disable or cut off power to the drill rig, or at least some parts of the drill rig, on receipt of a shutdown command. Various implementations may be effected, depending on the model of drill rig. Some implementations may include, for example, but are not limited to, a switch coupled to the ignition of the drill rig, and a switch or valve adapted to cut a fuel supply or power supply to the drill rig. It will be appreciated that multiple variations of the drill shutdown module may be implemented in order to disable a function of an autonomous drill rig, including any device or means by which to neutralise a mechanical, electrical, hydraulic, or pneumatic system of the drill rig.

Figure 5A:
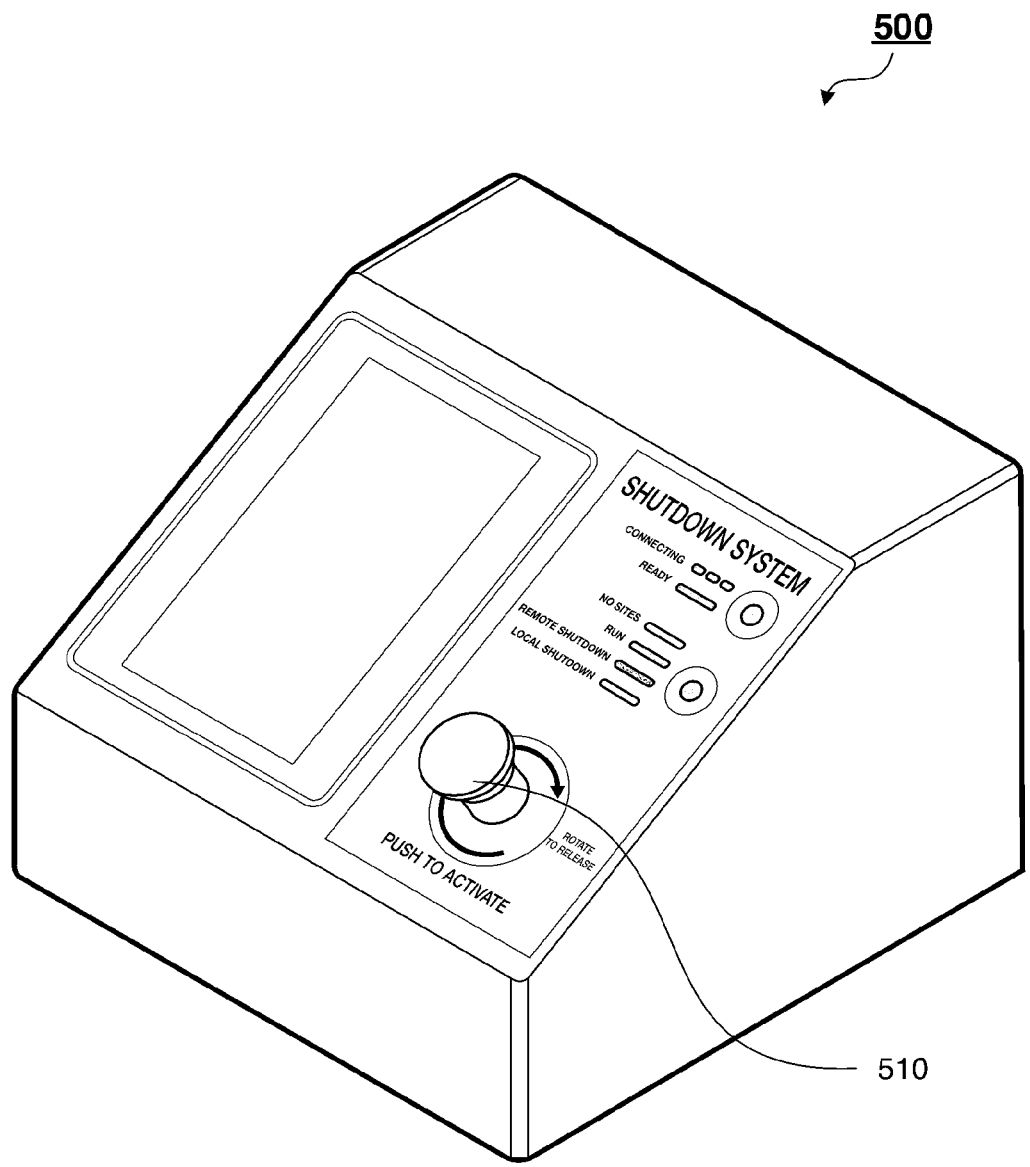
FIGS. 5a and 5b are illustrations of an embodiment of a deactivation control in a drill control station.

The deactivation control may be implemented using a physical switch, such as a mechanical or electromechanical switch that is activated when depressed or a slider that is moved to an activated state. As the deactivation control may be utilised to effect an emergency shutdown of a set of drill rigs, the deactivation control may be a distinctive colour, such as red. FIG. 5a is an illustration of a deactivation control 500 that includes a physical button 510 that is activated by depressing the button 510. In the example of FIG. 5a, the button is red and is presented on a yellow background, to highlight the presence of the deactivation control and its importance.

Figure 5B:
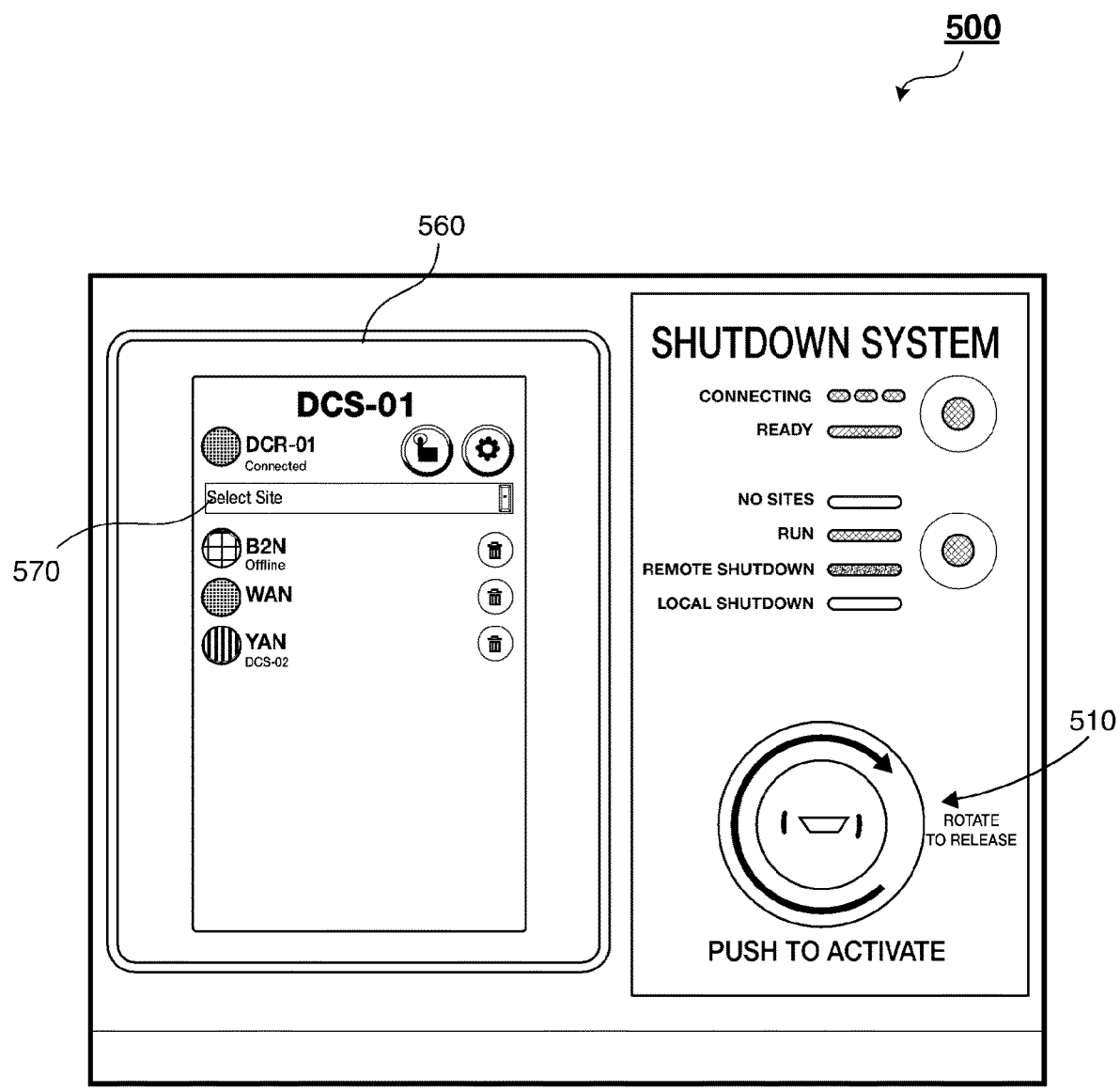

FIG. 5b is an alternative view of the deactivation control 500 of FIG. 5a accessed by a drill controller. In the example of FIG. 5b, the deactivation control 500 is implemented using a computing device, such as a PLC, and includes a display region 560, which indicates that the deactivation module 500 is associated with a drill control station called DCS-01. The display 560 includes a user interface 570 by which the drill controller selects a mine site to be controlled by drill control station DCS-01. In this example, the drill controller is able to select from three mine sites: B2N, WAN, and YAN. B2N is indicated as being offline. YAN is indicated as having been shutdown as a result of a deactivation control having been activated, in this case by drill control station DCS-02. The drill controller utilises a drop down box to select an available mine site to be controlled via DCS-01. The drill controller is able to select multiple mine sites at which to operate drills and may do so by repeating selection of a mine site using the drop down list box. Depending on the implementation, the drill controller may use the user interface 570 to specify specific drill rigs within a selected mine site. It will be appreciated that other interface components may equally be practised, such as check boxes and the like.

In the scenario in which the drill controller selects mine site WAN, the deactivation control 500 is associated with the mine site WAN and the drill controller will be able to select for control, via the drill control station DCS-01, any one or more of the autonomous drill rigs at mine site WAN. As the deactivation control 500 is now associated with the mine site WAN, when the button 510 is depressed, the deactivation control 500 will send a shutdown message to all drill rigs at the mine site WAN.

In one embodiment, the deactivation control 500 is coupled to or integral with the drill control station DCS-01, such that the drill controller is only able to operate selected drill rigs at one or more mine sites by using the drill control station DCS-01 once the drill operator has used the deactivation control 500 to select the mine sites and thus associate those mine sites with the deactivation control 500. This ensures that when any drill at a site is being controlled by a drill operator, that drill operator has the capability to shut down all drill rigs at that site by using the deactivation control. Further, the drill operator cannot operate a drill rig without first having emergency shutdown control over that drill rig and all other drill rigs operating at the same site.

In the example of FIG. 5b, the deactivation control 500 includes a button 510. The deactivation control 500 is associated with all mine sites being controlled by DCS-01. In the implementation of FIG. 5b, the button 510 is a physical button that is activated by being depressed by a drill controller 115. In the particular implementation of FIG. 5b, the deactivation control 500 is reactivated by rotating the button 510 once the button 510 is in the depressed state, whereupon a spring returns the button 510 to an initial state. Alternatively, the physical button 510 may be spring loaded and be reactivated by the spring returning the push button to a resting state.

In an alternative implementation, the deactivation control may include a virtual control represented on a display of a screen of the deactivation control, such as part of the display 560 of FIGS. 5a and 5b, or on a display of a screen that forms part of the drill control station. For example, the deactivation control may be a region of a display screen that may be activated by placing a cursor on that region and clicking a computer mouse or entering a keyboard command from a mouse or keyboard associated with or forming part of the drill control station, or by applying a gesture to a touch screen interface of the drill control station.

For example, in an alternative implementation, the deactivation control 500 includes a virtual button displayed in a region of a computer display 560 of the drill control station 500. The drill controller activates the deactivation control 550 by clicking on the virtual button using a mouse or other input device. In another implementation, the display 560 is a touchscreen display with the virtual button presented in a region of the display 560, wherein the drill controller activates the deactivation control 550 by applying a predefined gesture to the virtual button, such as pressing, swiping, using two fingers to swipe, and the like.

In alternative implementations, the deactivation control is implemented using a button, switch, a turn-key, a dial, a slider, pedal, or other suitable input device or means, whether physical or virtual, as displayed on a display screen of a drill control station. Further, the deactivation control may also include an audible alarm that is emitted when the deactivation control is activated. The deactivation control may also cause a visual alarm to appear when activated, such as illuminating a light or portion of a display of the drill control station.

In some embodiments, resetting the deactivation control can only be performed at the drill control station on which the deactivation control was activated. This prevents a drill operator utilising a second drill control centre from resetting a deactivation control activated at a first drill control centre, which might allow the autonomous drill rigs affected by activation of the deactivation control to resume operations whilst the reason for activating the deactivation control persists. In other embodiments, a supervisor drill controller may have authority to reset deactivation controls from another drill control station.

Figure 4:
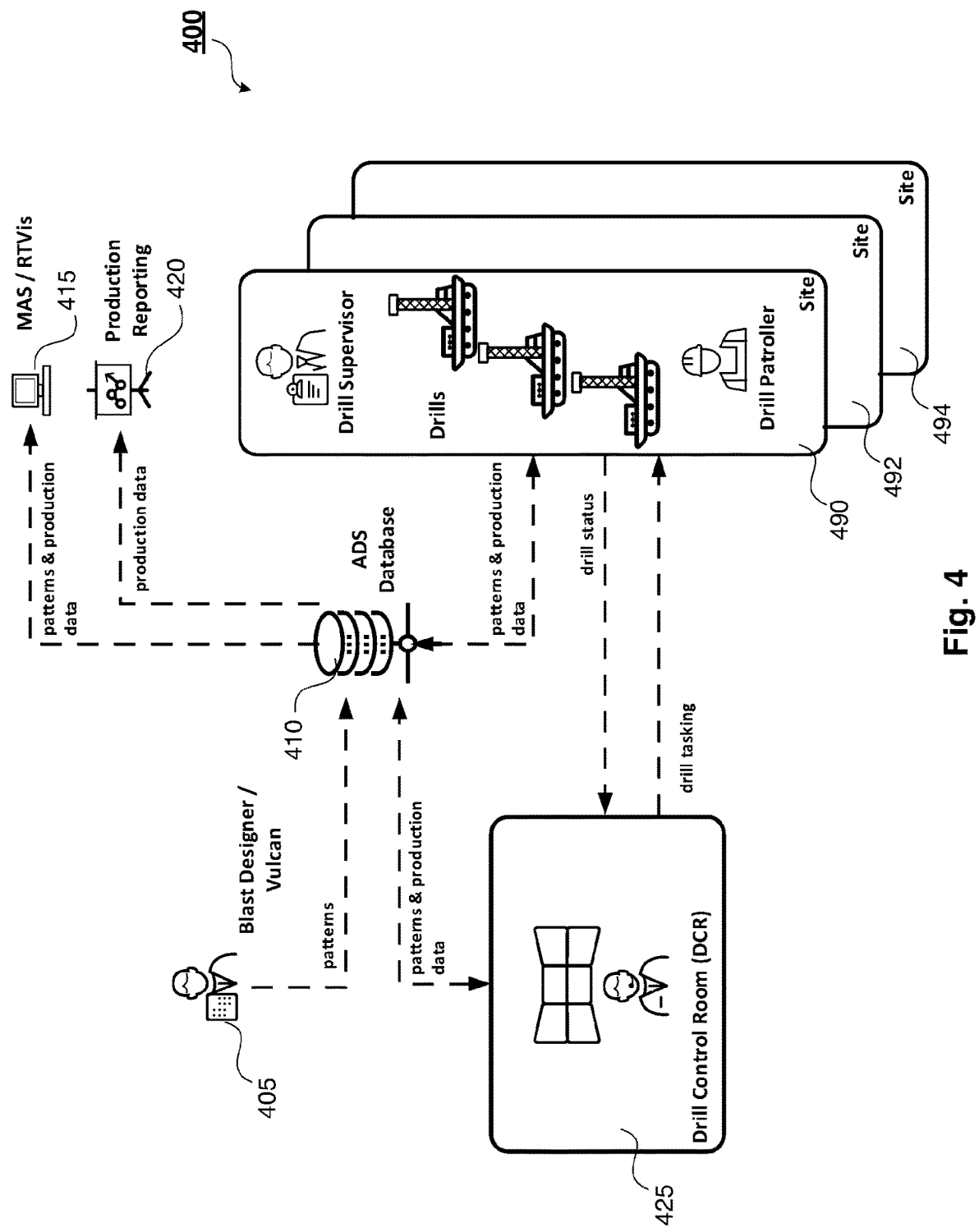
FIG. 4 is a schematic block diagram representation of a system for controlling autonomous drill rigs.

FIG. 4 is a schematic block diagram representation of a system 400 for controlling operation of autonomous drill rigs. In the example of FIG. 4, the system 400 includes three mine sites 490, 492, 494. Each of the mine sites is associated with one or more autonomous drill rigs, a drill supervisor, and a drill patroller. The drill supervisor at each mine site coordinates site drilling activity and monitors the pattern status and time usage. The drill patroller at each mine site provides on-ground support for the autonomous drill rigs, such as assisting with drill bit changes, water filling, and clean-up.

A drill and blast engineer 405 designs a drill pattern of blast holes to be drilled by a set of autonomous drill rigs on a mine site. In one scenario, the drill and blast engineer utilises Maptek Vulcan mine planning software, by Maptek Pty Ltd, to design the drill pattern. The drill pattern is then uploaded to an Autonomous Drilling System (ADS) database 410. Data stored on the ADS database 410, including drill patterns designed by the drill and blast engineer 405 and production data, are available to each of a Mine Automation System (MAS) or mine visualisation system (RTVis) platform 415 and a Production Reporting module 420.

A MAS provides data aggregation, analysis and planning support and optimisation autonomous systems for mining. A mine visualisation system (RTVis) within the context of this specification is a desktop software application that provides visual representations of one or more features of a mine site, including, but not limited to, one or more of a 3D view of a mine site, real-time mine topology, equipment locations, mine geology, ore-body knowledge, and production status. The RTVis utilises the data provided by the MAS.

Drill patterns and production data from the ADS database 410 are also made available to a drill control room 425 and to each of the mine sites 490, 492, 494. The drill control room 425 is staffed by one or more drill controllers, each of which utilises a drill control station to supervise operation of autonomous drill rigs at one or more of the mine sites 490, 492, 494. The drill control room 425 sends drill tasking data to each of the mine sites 490, 492, 494. In return, each of the mine sites 490, 492, 494 returns drill status data to the drill control room 425.

FIG. 1 is a schematic block diagram representation of a system 100 in accordance with the present disclosure. In the example of FIG. 1, a deactivation control is provided that, when activated, sends a shutdown signal to all drill rigs operating on all of the mine sites with which that deactivation control is associated. The system 100 includes a remote control centre 110 for remotely operating control of drill rigs at one or more mine sites. The remote control centre 100 includes a drill control station 120 that is accessed by a drill controller 115 to monitor and control operation of drill rigs at remotely located mine sites. Whilst the example of FIG. 1 shows a single drill control station 120, other embodiments may include multiple drill control stations to allow contemporaneous access by multiple drill controllers. In a large installation, different drill controllers utilise a set of drill control stations to control an allocated set of drill rigs across one or more mine sites.

The drill control station 120 is coupled to a communications network 150. The communications network 150 may be implemented utilising one or more wired communications links, wireless communications links, or any combination thereof. In particular, the communications network 150 may include a local area network (LAN), a wide area network (WAN), a telecommunications network, or any combination thereof. A telecommunications network may include, but is not limited to, a telephony network, such as a Public Switch Telephony Network (PSTN) or a cellular mobile telephony network, the Internet, or any combination thereof.

In the example of FIG. 1, the system 100 includes a mine site 160 that has a set of n drill rigs 170a . . . n. Each of the drill rigs 170a . . . n is equipped with a wireless transceiver for coupling the respective drill rigs 170a . . . n with the communications network 150. During normal operation, the drill control station 120 and the drill rigs 170a . . . n communicate with each other via the communications network 150. The drill rigs 170a . . . n are able to send information back to the drill control station 120 at the remote control centre 110, such as information about the ground conditions, pressure on controls, and other measurement while drilling (MWD) data, such as drill bit pull down pressure and speed.

Further, each of the drill rigs 170a . . . n is capable of operating in an autonomous mode, based on instructions received from the drill control station 120. In autonomous mode, a drill rig may perform one or more functions in accordance with a drilling plan, such as tramming to a location for a next hole to be drilled, raising or lowering a mast associated with the drill rig, or drilling a hole, without having a drill operator on board to control operation of the drill rig.

The drill control station 120 is associated with a deactivation control 130 that, when activated, generates a shutdown signal to be transmitted to all drill rigs at a set of mine sites associated with that deactivation control 130. The deactivation control 130 is coupled to the drill control station 120. In this example, the drill operator 115 utilises a user interface of the deactivation control 130 to select a set of mine sites to be controlled by the deactivation control 130 and from which the drill controller 115 can select available drill rigs to be controlled by the drill control station 120. In some embodiments, the drill operator first selects a mine site and then selects a set of drill rigs at the selected mine site or is automatically assigned all drill rigs at the selected mine site. In other embodiments, the drill operator is able to select individual drill rigs to control. In every case, each drill rig is associated with a mine site. The deactivation control 130 is associated with each mine site for which at least one drill rig is to be controlled by the drill control station 120.

In one implementation, the deactivation control 130 is implemented using a computing device, such as a PLC, which stores a set of mine sites associated with the deactivation control 130, based on the selection made by the drill control operator 115.

In the example of FIG. 1, the deactivation control 130 sends information relating to the selected drill rigs to the drill control station 120 and the drill control station 120 only enables the drill controller 115 to control drill rigs on mine sites that have been associated with the deactivation control 130.

Depending on the implementation, the set of mine sites associated with the deactivation control 130 may correspond to a single mine site, in which case the deactivation control 130 operates, when activated, to shut down all drill rigs at the mine site. In such a scenario, the deactivation control 130 may be associated with the mine site 160, such that a shutdown command sent from the deactivation control 130 in response to activation of the deactivation control is transmitted to each of the drill rigs 170a . . . n of the mine site 160. Alternatively, the set of mine sites associated with the deactivation control 130 may correspond to a plurality of different mine sites. In such a scenario, activating the deactivation control 130 causes a shutdown command to be sent to all drill rigs operating at all mine sites for which any drill rig is under control of the drill control station 120.

In a further embodiment in which a drill controller 115 utilises the drill control station 120 to select drill rigs to control by selecting one or more mine sites and then gains control of all drill rigs at the selected mine sites, then activating the deactivation control 130 sends a shutdown command to all drill rigs at all of the selected mine sites under control of that drill control station 120.

In order to implement the deactivation control system of the present disclosure, the remote control centre 110 includes a control centre controller 140 that is coupled to the deactivation control 130. In some embodiments, when the drill controller 115 utilises the deactivation control 130 to select a set of mine sites, the deactivation control 130 sends the set of mine sites to the control centre controller 140, which stores a mapping between the deactivation control 130 and the set of mine sites associated with that deactivation control 130. Further, the mine site 160 is equipped with a mine site controller 165 that is coupled to the communications network 150 in order to communicate with the control centre controller 140 and includes a wireless transceiver for communicating wirelessly with wireless transceivers on each of the drill rigs 170a . . . n. Depending on the implementation, the mine site controller 165 may be located on the mine site 160 or remotely from the mine site 160.

When the drill controller 115 activates the deactivation control 130, the deactivation control 130 sends a deactivation command (e.g., a shutdown message) for each mine site associated with the deactivation control 130. The control centre controller 140 receives the deactivation command(s) from the deactivation control 130 and is responsible for disseminating the deactivation command to the mine site controllers 165 at the mine sites indicated by the deactivation messages. In implementations of the remote control centre 110 that contain multiple drill control stations, each deactivation control associated with a drill control station is coupled to the control centre controller 140.

In some embodiments, the deactivation command from the deactivation control 130 includes the set of mine sites associated with the deactivation control, so that the control centre controller 140 knows which mine sites are to be shutdown. In alternate embodiments, as described above, the control centre controller 140 stores a mapping between the deactivation control 130 and a set of mine sites associated with that deactivation control, as a part of the process of the drill controller 115 making an initial selection of mine sites.

Each of the drill rigs 170a . . . n is equipped with a corresponding drill shutdown module 175a . . . n that is adapted to disable at least one function to the respective drill rig 170a . . . n on receipt of a shutdown command from the remote control centre 110 via the site controller 165.

In one implementation, the drill shutdown module 175a . . . n, one receipt of a shutdown command, instructs an on-drill supervisory controller to perform the shutdown. For example, the on-drill supervisory controller may be implemented using a programmable logic controller for effecting autonomous drill rig functions, including powering on and off one or more features of the drill rig, such as operation of the drill bit, tramming, and overall power to the drill rig. In such an implementation, the on-drill supervisory controller controls one or more functions of the drill rig, such that it is able to disable one or more of those functions on receipt of an instruction from the drill shutdown module 175a . . . n. The drill shutdown module 175a . . . n is coupled to the on-drill supervisory controller to enable communication therebetween. In some embodiments, there is a hardwired link between the drill shutdown module 175a . . . n and the on-drill supervisory controller, such that communication therebetween is not subject to any network interference.

In one implementation, the drill shutdown module 175a . . . n is coupled to an existing emergency stop circuit on the respective drill rig 170a . . . n, such that the drill shutdown module 175a . . . n is able to provide an input to the existing emergency stop circuit to effect an emergency stop on the respective drill rig 170 . . . n. In another implementation, the drill shutdown module includes a switch that is coupled to the ignition of the drill rig to which it is fitted. The drill shutdown module is thus able to turn off the ignition. In an further implementation, the drill shutdown module includes a switch or valve that is adapted to cut off power or fuel to the drill rig. Other implementations of the drill shutdown module may equally be practised to bring the drill rig to a stop and cease operation or to inhibit or otherwise neutralise a function of the drill rig, such as neutralising one or more hydraulic pumps of the drill rig or by providing an input signal to effect neutralisation, inhibition, or cessation of a function of the drill rig.

The drill controller 115 is able to access a user interface of the drill control station 120 to send information and commands, via the communications network 150 to the drill rigs 170a . . . n. The information and commands may relate, for example, to a drilling plan. Thus, the drill controller 115 is able to utilise the drill control station 120 to prepare and allocate tasks to each of the autonomous drill rigs 170a . . . n.

While the drill controller 115 is able to monitor and control each of the autonomous drill rigs 170a . . . n from a remote location, the drill controller 115 may be assisted by an on-site drill patroller located at the mine site 160. The drill patroller can perform on-site visual inspections of the drill rigs 170a . . . n and the mine site itself, perform consumable changes, and inform the drill controller 115 of any issues.

As described above, depending on the application, the deactivation control 130 may implemented in many different ways. For example, the deactivation control 130 may be implemented using an electromechanical button or switch, in which the user 115 depresses an upper surface of the button or switch to activate the deactivation control 130, as shown in FIG. 5a.

Alternatively, the deactivation control 130 may be implemented using a region of a display screen of the drill control station 120, wherein the region is adapted to receive user input from the drill controller 115. In such an implementation, the deactivation control 130 may use a virtual button, slider, or other input device that is adapted to receive a mouse click, mouse drag, or keyboard input to activate the deactivation control 130. In an implementation in which the deactivation control 130 includes a touch screen display, a region of the touch screen display may be adapted to receive an input gesture from the user 115, such as a swipe, touch, or the like, in order to activate the deactivation control 130.

As described above, the deactivation modules 175a . . . n are adapted to disable at least one function of each respective drill rig 170a . . . n. In one example, the drill deactivation modules 175a . . . n are adapted to shut down power to the respective drill rigs 170a . . . n. In such an example, the deactivation control 130 provides the drill controller 115 with a one-step interface by which to effect an emergency stop of all drill rigs operating on mine sites associated with the drill controller 115.

When the drill controller 115 presses the deactivation control 130, the deactivation control 130 sends a deactivation signal (shutdown command) to the control centre controller 140. The control centre controller 140 sends a deactivation signal to each of the drill rigs 170a . . . n operating on mine sites associated with the deactivation control 130, via the communications network 150 and the mine site controller 165.

When a drill shutdown module 175a . . . n receives the deactivation signal, the drill shutdown module shuts down power to the corresponding drill rig 170a . . . n. Thus, the deactivation control 130 provides the drill controller 115 with the ability to effect an emergency stop for all drill rigs operating on mine sites associated with that deactivation control 130. In a scenario in which a potential problem is identified, such as an unauthorised personnel being present on a mine site or an impending collision, a drill operator is able to disable at least some functionality of all drill rigs on all mine sites for which that drill controller is controlling drill rigs.

In some implementations, the drill shutdown modules 175a . . . n are programmed to protect the respective drill rigs 170a . . . n, such that the shutdown modules 175a . . . n are activated when a predefined period of time elapses between signals received from the mine site controller 165. Such implementations protect the drill rigs 170a . . . n from causing damage to the mine site 165 by continuing to operate under circumstances in which communication is lost between the mine site controller 165 and the respective drill rigs 170a . . . n.

As indicated above, in some implementations the deactivation module 130 is integral with the drill control station 120, in which case the deactivation signal (shutdown command) is sent from the drill control station 120 to the control centre controller 140. An advantage of having the deactivation control 130 implemented as a standalone device in communication with the control centre controller 140 is that such an implementation is not dependent on the functional status of the drill control station 120.

While the system 100 in the example of FIG. 1 shows a single mine site 160, the remote control centre 110 may be utilised to control multiple mine sites, with one or more drill rigs located at each mine site. In such alternative embodiments, the drill control station 120 enables the drill controller 115 to select one or more drill rigs from each of the respective mine sites to be controlled by the drill control station 120 and thus associated with the deactivation control 130.

In this way, the drill controller 115 can use a single deactivation control 130 to effect an emergency stop of either all drill rigs at all mine sites for which the drill controller has control over at least one drill rig, or a predefined set of drill rigs at multiple mine sites, depending on the implementation. Alternatively, a user interface of the drill control station 120 enables the drill controller 115 to select one or more of the mine sites to be associated with the drill control station 120 and the associated deactivation control 130. The ability to effect an emergency stop remotely to a selected set of drill rigs provides a safer operating environment.

Depending on the application, the drill control station 120 may be associated with multiple deactivation controls 130a . . . n implemented as separate regions of a user interface. In such an implementation, the drill controller 115 is able to associate each of the deactivation controls 130a . . . n with different groups of drill rigs selected from one or more mine sites controlled by the remote control centre 110.

Depending on the application, the remote control centre 110 may be co-located with the mine site 160 or alternatively may be located remotely, such as at a remotely location operations centre.

In a further example, the remote control centre 110 includes a plurality of drill control stations 120 with associated deactivation controls 130, such that each of a plurality of drill controllers is able to effect an emergency stop of a selection of mine sites associated with the respective deactivation controls or a selection of drill rigs associated with the corresponding deactivation control 130. In one implementation, the remote control centre 110 includes a plurality of drill control stations, such that a corresponding plurality of drill controllers is able to control autonomous drill rigs at a corresponding plurality of mine sites, with each drill control station having an associated deactivation control that is associated with a selected one of the plurality of mine sites. Thus, if there are three mine sites, there are three drill control stations, with each drill control station having an associated deactivation control associated with one of the three mine sites.

The example of FIG. 1 also shows a configuration database 190, which can be used to store data relating to the configuration of each mine site 160 and the associations between the deactivation controls 130a . . . n and the drill rigs 170a . . . n.

Figure 2:
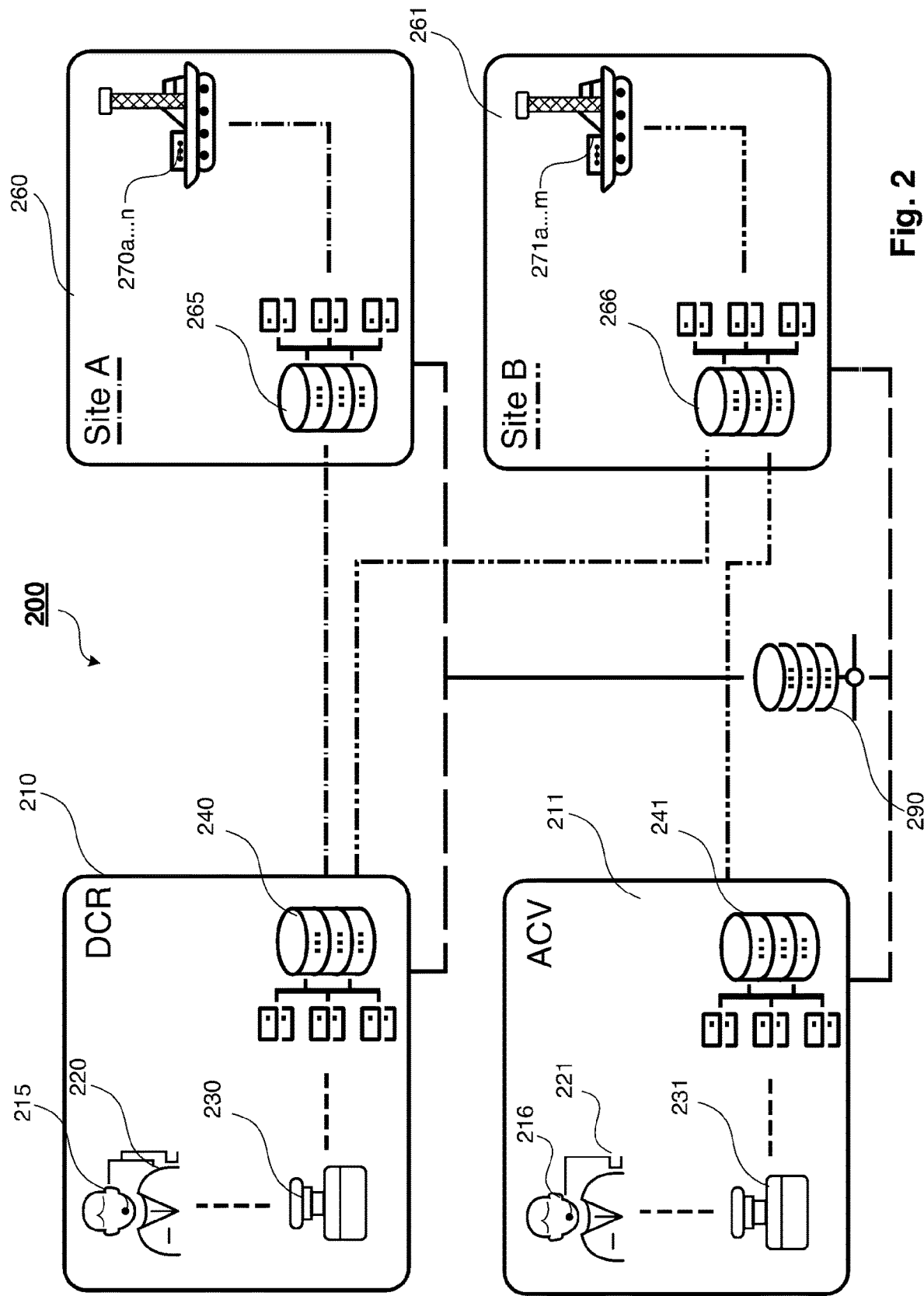
FIG. 2 is a schematic representation of a system on which one or more embodiments of the present disclosure may be practised.

FIG. 2 is a schematic block diagram representation of a system 200 that includes multiple mine sites, Site A 260 and Site B 261. A first plurality of autonomous drill rigs 270a . . . n operate at Site A 260 and a second plurality of autonomous drill rigs 271a . . . m operate at Site B 261. Site A 260 has a first mine site controller 265 for communicating wirelessly with the drill rigs 270a . . . n. Site B 261 has a second mine site controller 266 for communicating wirelessly with the drill rigs 271a . . . n.

A first remote control centre in the form of a Drill Control Room (DCR) 210 includes a first drill control station (DCS) 220 accessible by a first drill controller 215. The drill control station 220 may be implemented utilising a computing device on which is executing drill control software. In some embodiments, the drill control software is DAS-Display, which executes on the drill control station and enables a user to monitor and control drill rigs. The DAS-Display software is configured to communicate with software executing on each of the autonomous drill rigs 270a . . . n, 271a . . . m. The first drill control station 220 is associated with a first deactivation control 230 that can be associated with a set of drill rigs operating at Site A and/or Site B.

A second remote control centre in the form of an automation control vehicle (ACV) 211 includes a second drill control station 221 accessible by a second drill controller 216. The second drill control station 221 is associated with a second deactivation control 231 that can be associated with a set of drill rigs operating at Site A and/or Site B. The ACV 211 acts as a mobile control centre and may be used, for example, during system testing, deployment of drill rigs to a new site, as a backup for disaster recovery, and the like.

The system 200 also includes a configuration database 290 coupled to each of the DCR 210 and the ACV 211 for storing the configurations of Site A 260 and Site B 261.

Activating either the first deactivation control 230 or the second deactivation control 231 results in an emergency shutdown signal being sent to the drill rigs operating at the set of mine sites associated with the respective deactivation control. Each of the drill rigs 270a . . . n, 271a . . . m has a corresponding drill shutdown module that is adapted to cut off power to the respective drill rig on receipt of an emergency shutdown signal.

There are numerous circumstances that might make it desirable to effect an emergency shutdown of one or more autonomous drill rigs. For example, the presence of personnel, especially unauthorised personnel, within a drilling area, or an impending collision between drill rigs, at least one of which is an autonomous drill rig associated with the deactivation control, are circumstances under which an emergency shutdown might be desirable. Other circumstances may relate, for example, to drilling difficulties that arise during drilling, such as bogging during drilling, stalling during tramming, or timeout during levelling, that may result in the need for remote intervention by the drill controller. In some situations, the need for remote intervention by the drill controller may be acute, in which case the deactivation control provides the drill controller with a single interface point by which to effect an emergency shutdown of the drill rigs associated with that deactivation control.

Some embodiments include an authorisation measure that permits any autonomous drill rig to be controlled without selecting the mine site at which the drill rig is located. Such an authorisation measure provides a fallback in the scenario in which the drill control station fails.

Figure 7:
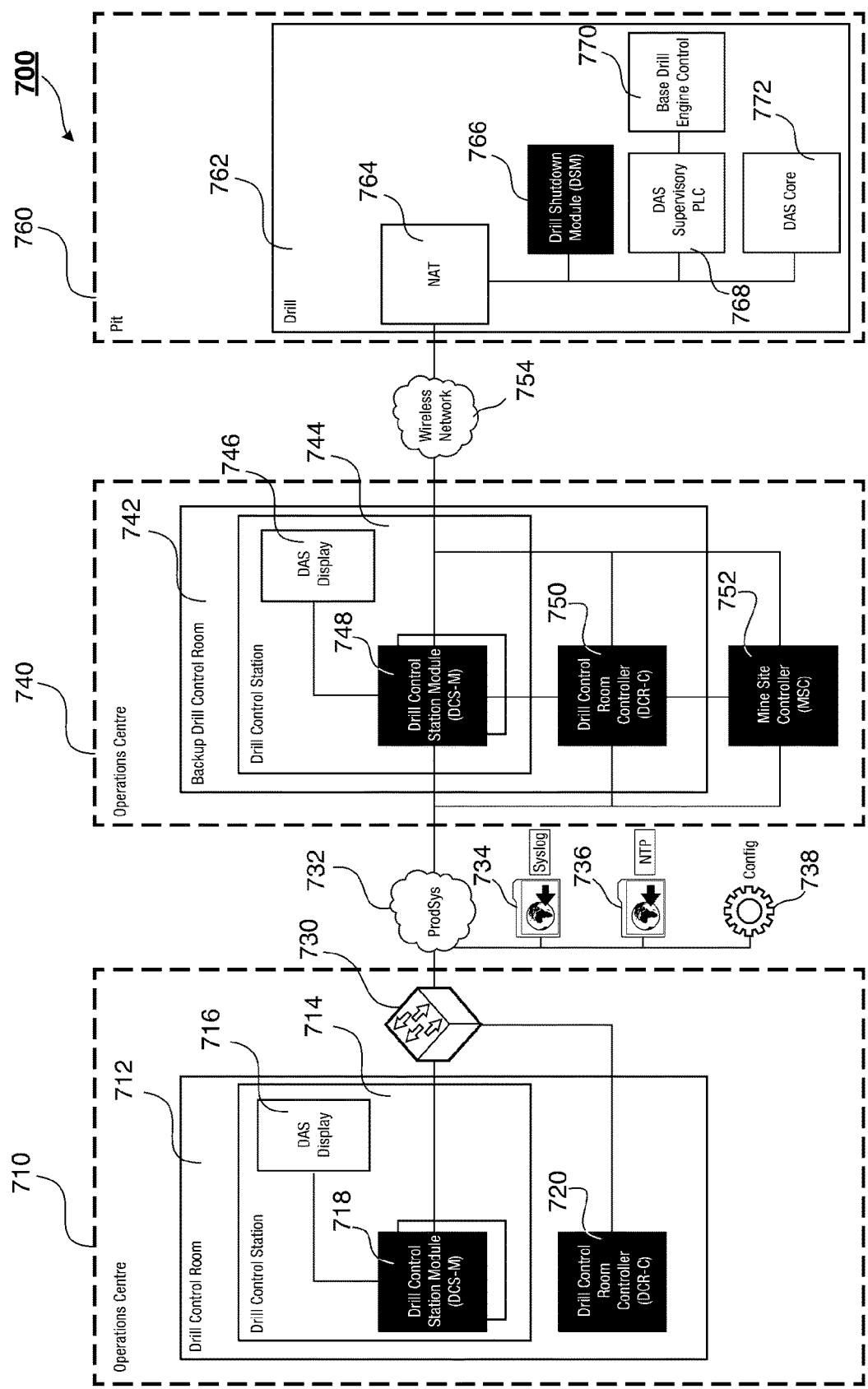
FIG. 7 is a schematic block diagram representation of a system utilising a deactivation control to effect disablement of at least one function on each drill rig assigned to a drill control station.

FIG. 7 is a schematic block diagram representation of a system 700 that incorporates an authorisation measure in order to ensure that the deactivation control functions correctly. The authorisation measure requires that a drill control module on a drill rig receives matching tokens from each of: a mine site controller and from a drill control station, via a deactivation control. The matching tokens must be received within a predefined time period of each other, in order to authenticate the token match. If matching tokens are not received within a predefined time period, then the drill control module shutdowns the drill rig to ensure no unsafe operation of the drill rig occurs.

The system 700 includes a first operations centre 710, a second operations centre 740, and a pit 760. The pit corresponds to a mine site that is being blasted by a drill rig 762. The drill rig 762 has a drill control module implemented using a Network Address Translator (NAT) 764, which is coupled to a drill shutdown module (DSM) 766, a DAS Supervisory PLC (DAS-S) 768 and associated Base Drill Engine Control 770, and a DAS Core (DAS-C) 772. The NAT 764 is coupled to a wireless network 754.

The first operations centre 710 includes a drill control room 712 in which are located a drill control station 714 and a drill control room controller (DCR-R) 720, corresponding to the control centre controller 140 of FIG. 1. The drill control station 714 includes a DAS display (DAS-D) 716 that is coupled to a Drill Control Station Module (DCS-M) 718, which in turn is coupled to a network router 730. The DCR-R 720 is also coupled to the network router 730. The DCS-M 718 is a deactivation module and corresponds to the deactivation module 130 of FIG. 1.

The network router 730 is coupled to a communications network 732 that includes a System Log 734, a Network Time Protocol (NTP) server 736, and a Configuration file 738.

The first operations centre 710 is coupled to the second operations centre 740 via the communications network 732. The second operations centre 740 includes a backup drill control room 742 in which are located a second drill control station 744 and a second DCR-C 750. The second operations centre also includes a mine site controller (MSC) 752. The second drill control station 744 includes a second DAS display (DAS-D) 746 coupled to a second DCS-M 748. The second DCS-M 748 is coupled to the second DCR-C 750, which is in turn coupled to the MSC 752.

Each of the second DCS-M 749, the DCR-C 750, and the MSC 752 is coupled, via the communications network 754, with the pit 760. The communications network 754 may be implemented using one or more wired or wireless links, or any combination thereof, but includes at least one wireless link to the drill rig 762.

In one implementation, each mine site controller periodically (e.g., every few seconds) propagates an authorisation token to both DAS core 772 (DAS-C) and DAS-S 768 via the following paths:

MSC->DCR-C-[by operating site]->DSC-M->DAS-D->DAS-C->DAS-S

MSC->DSM->DAS-S

That is, for the first operations centre 710, the MSC 752 generates a first token that is sent via the DCR-C 720 (control centre controller 140), the DCS-M 718 (the deactivation control 130), the DAS-D 716 (the drill control station 120), and then to the DAS-S 768. The MSC 752 generates a second token that is sent to the DSM 766 of the drill rig 762 and then to the DAS-S 768. The DAS-S 768 compares the first and second tokens to perform validation of the authorisation.

DAS-D 716 only receives a token from DCS-M 718 if the site has been selected. If the tokens received by DAS-S 768 from the DSM 766 and DAS-C 772 do not match, DAS-S 768 shuts the drill rig down. The authorisation system provides a safeguard so that a drill control station is only able to control drill rigs on mine sites for which shutdown control is available. If DAS-D 716 fails and permits control of any drill rigs, it will not have the correct token and those drill rigs will shut down.

The control system described herein provides a simple, yet powerful, interface in the form of a deactivation control by which a remote drill controller is able to effect an emergency shutdown of a set of autonomous drill rigs across one or more remote sites.

Figure 3:
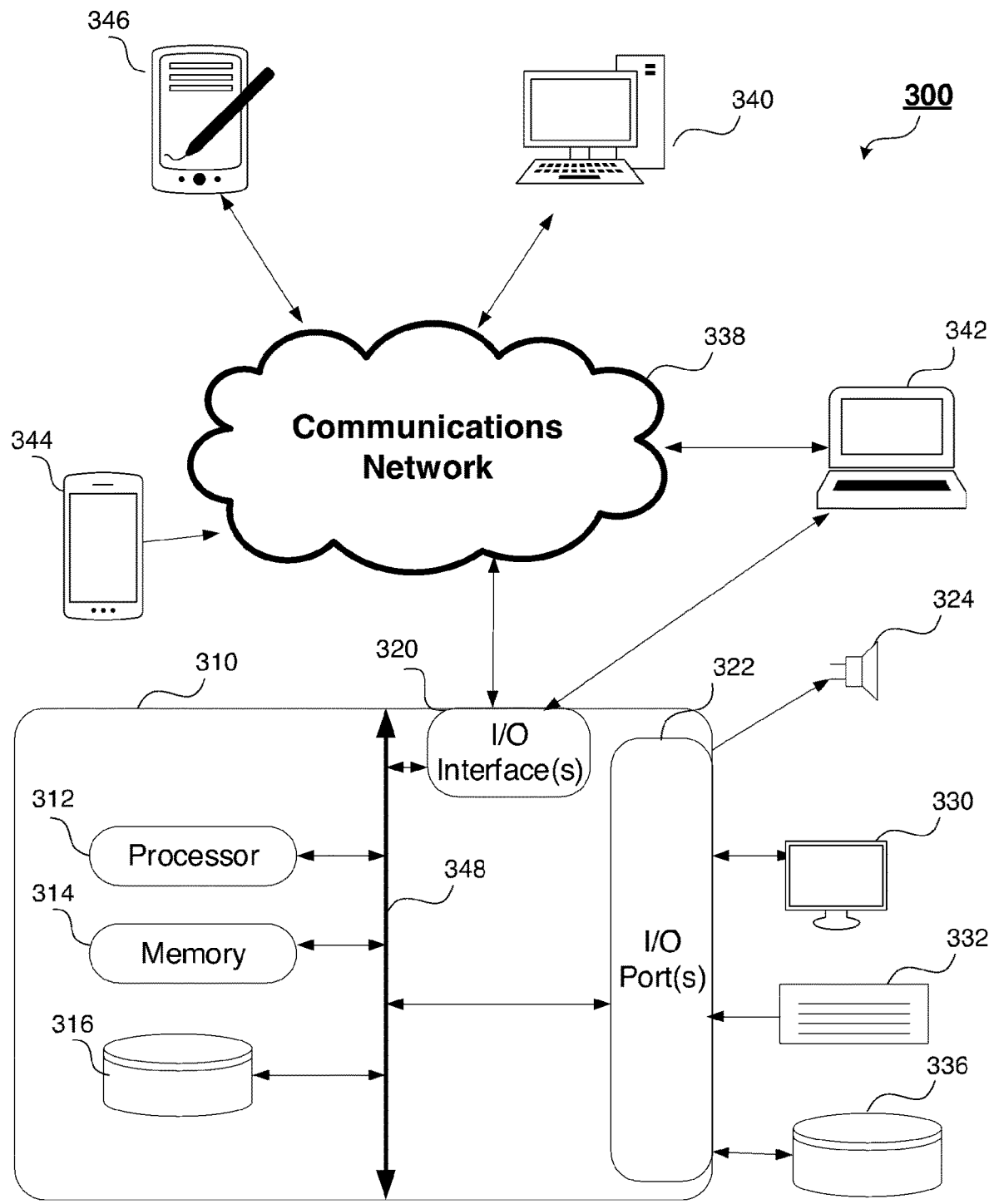
FIG. 3 is a schematic block diagram representation of a system that includes a general purpose computer on which one or more embodiments of the present disclosure may be practised.

The control system of the present disclosure may be practised using one or more computing devices, such as a general purpose computer, programmable logic controller, embedded computer, or computer server programmed and adapted to function in an improved manner. For example, the drill control station, deactivation control, and drill shutdown modules may be implemented using general purpose computers, programmable logic controllers, embedded computers, or computer servers. FIG. 3 is a schematic block diagram representation of a system 300 that includes a general purpose computer 310. The general purpose computer 310 includes a plurality of components, including: a processor 312, a memory 314, a storage medium 316, input/output (I/O) interfaces 320, and input/output (I/O) ports 322. Components of the general purpose computer 310 generally communicate with each other using one or more buses 348.

The memory 314 may be implemented using Random Access Memory (RAM), Read Only Memory (ROM), or a combination thereof. The storage medium 316 may be implemented as one or more of a hard disk drive, a solid state "flash" drive, an optical disk drive, or other storage means. The storage medium 316 may be utilised to store one or more computer programs, including an operating system, software applications, and data. In one mode of operation, instructions from one or more computer programs stored in the storage medium 316 are loaded into the memory 314 via the bus 348. Instructions loaded into the memory 314 are then made available via the bus 348 or other means for execution by the processor 312 to implement a mode of operation in accordance with the executed instructions.

One or more peripheral devices may be coupled to the general purpose computer 310 via the I/O ports 322. In the example of FIG. 3, the general purpose computer 310 is coupled to each of a speaker 324, a display device 330, an input device 332, and an external storage medium 336. The speaker 324 may be implemented using one or more speakers, internal to the computing device 310 or external to the computing device 310, such as in a stereo or surround sound system. In the example in which the general purpose computer 310 is utilised to implement a control system in accordance with FIG. 1 or FIG. 2, one or more peripheral devices may relate to the deactivation controls 130, 230, 231.

The display device 330 may be a computer monitor, such as a cathode ray tube screen, plasma screen, liquid crystal display (LCD) screen, or Light Emitting Diode (LED) display screen. The display 330 may receive information from the computer 310 in a conventional manner, wherein the information is presented on the display device 330 for viewing by a user. The display device 330 may optionally be implemented using a touch screen to enable a user to provide input to the general purpose computer 310. The touch screen may be, for example, a capacitive touch screen, a resistive touchscreen, a surface acoustic wave touchscreen, or the like. In the example in which the general purpose computer 310 is utilised to implement the drill control station 120 of FIG. 1, the display device 310 may display a user interface for receiving inputs from the drill controller 115 and displaying information relating to the operation and control of the drill rigs 170a . . . n. Further, in the example in which the deactivation control 130 is implemented as a virtual button on a user interface, the deactivation control 130 is displayed in a region of the display device 310.

The input device 332 may be a keyboard, a mouse, a stylus, drawing tablet, or any combination thereof, for receiving input from a user. The external storage medium 336 may include an external hard disk drive (HDD), an optical drive, a floppy disk drive, a flash drive, solid state drive (SSD), or any combination thereof and may be implemented as a single instance or multiple instances of any one or more of those devices. For example, the external storage medium 336 may be implemented as an array of hard disk drives.

The I/O interfaces 320 facilitate the exchange of information between the general purpose computing device 310 and other computing devices. The I/O interfaces may be implemented using an internal or external modem, an Ethernet connection, or the like, to enable coupling to a transmission medium. In the example of FIG. 3, the I/O interfaces 322 are coupled to a communications network 338 and directly to a computing device 342. The computing device 342 is shown as a personal computer, but may be equally be practised using a smartphone, laptop, or a tablet device. Direct communication between the general purpose computer 310 and the computing device 342 may be implemented using a wireless or wired transmission link.

The communications network 338 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The general purpose computer 310 is able to communicate via the communications network 338 to other computing devices connected to the communications network 338, such as the mobile telephone handset 344, the touchscreen smartphone 346, the personal computer 340, and the computing device 342.

One or more instances of the general purpose computer 310 may be utilised to implement a drill control station, mine site controller, and/or remote centre controller in accordance with the present disclosure. In such an embodiment, the memory 314 and storage 316 are utilised to store data relating to the configuration of drills at one or more mine sites and the allocation of drill rigs to one or more deactivation controls. Software for implementing the control system is stored in one or both of the memory 314 and storage 316 for execution on the processor 312. The software includes computer program code for implementing method steps in accordance with the method of data management and transmission described herein.

INDUSTRIAL APPLICABILITY

The arrangements described are applicable to the mining industry.

Although the invention has been described with reference to specific examples, it will be appreciated by those skilled in the art that the invention may be embodied in many other forms. The foregoing describes only some embodiments of the present invention, and modifications and/or changes can be made thereto without departing from the scope and spirit of the invention, the embodiments being illustrative and not restrictive.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Reference throughout this specification to "one embodiment," "an embodiment," "some embodiments," or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

While some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

Note that when a method is described that includes several elements, e.g., several steps, no ordering of such elements, e.g., of such steps is implied, unless specifically stated.

The term "coupled" should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply direction. Hence, the expression "a device A is coupled to a device B" may be synonymous with the expression "a device B is coupled to a device A". "Coupled" may mean that two or more elements are either in direct physical or electrical contact, or that two or more elements are not in direct contact with each other but yet still co-operate or interact with each other.

We claim:

1. An emergency shutdown control system for remotely controlling operation of mobile autonomous mining drill rigs at a selected set of surface mine sites, comprising:
    a deactivation control;
    a control centre controller coupled to said deactivation control and storing an association between said deactivation control and said selected set of surface mine sites;
    a plurality of autonomous mining drill rigs, each drill rig having a drill shutdown module adapted to disable a function of the respective drill rig upon receipt of a deactivation command; and
    a mine site controller associated with each mine site in said selected set of surface mine sites, each said mine site controller being coupled wirelessly to all autonomous drill rigs located at the respective mine site with which the mine site controller is associated,
    wherein activating said deactivation control transmits a deactivation command from said deactivation control to said control centre controller and said control centre controller forwards the deactivation command to a mine site controller associated with each mine site in said set of surface mine sites for distribution to all of the autonomous drill rigs at that mine site, and
    wherein at least one of:
        (a) the drill shutdown module includes a switch coupled to an ignition of said drill rig,
        (b) the drill shutdown module is adapted to cut fuel supply to said drill rig, and
        (c) the deactivation control includes an electromechanical switch.

2. The emergency shutdown control system according to claim 1, further comprising:
    a drill control station coupled to said deactivation control, wherein said drill control station provides a user interface for selecting drill rigs to be controlled by said drill control stations, wherein drill rigs available for selection are restricted to drill rigs located at said selected set of surface mine sites.

3. The emergency shutdown control system according to claim 1, wherein said deactivation control includes a display region by which to associate the deactivation control with one or more mine sites.

4. The emergency shutdown control system according to claim 1, wherein the deactivation control is a region on a display of a computing device adapted to receive a user input, said user input being selected from the group consisting of: mouse button click, keyboard input, and touch screen gesture.

5. The emergency shutdown control system according to claim 1, wherein the plurality of autonomous mining drill rigs are autonomous blast hole drill rigs.

6. A method for remotely controlling a set of autonomous mining drill rigs at a selected set of surface mine sites, each autonomous drill rig having a drill shutdown module adapted to disable a function of the respective drill rig upon receipt of a deactivation command, the method comprising the steps of:
    selecting said set of surface mine sites to be associated with a deactivation control;
    storing said association between said deactivation control and said set of surface mine sites at a control centre controller;
    restricting selection of drill rigs by a drill control station coupled to said deactivation control to drill rigs located at said set of surface mine sites;
    sending a deactivation control to said control centre controller, upon activation of said deactivation control; and
    the control centre controller transmitting the deactivation command to all drill rigs located at all mine sites in said set of surface mine sites, wherein the drill shutdown module on each drill rig disables a function of said respective drill rig on receipt of said deactivation command,
    wherein at least one of:
        (a) the drill shutdown module includes a switch coupled to an ignition of said drill rig,
        (b) the drill shutdown module is adapted to cut fuel supply to said drill rig, and
        (c) the deactivation control includes an electromechanical switch.

7. The method according to claim 6, wherein said control centre controller transmits the deactivation command via a mine site controller associated with each mine site in said set of surface mine sites, each said mine site controller being coupled to each drill rig at each mine site with which the mine site controller is associated.

8. The method according to claim 6, wherein said deactivation control includes a display region by which to select said set of surface mine sites.

9. The method according to claim 6, wherein the set of autonomous mining drill rigs are autonomous blast hole drill rigs.

10. A control system for remotely controlling operation of mobile autonomous mining drill rigs, comprising:
   a plurality of autonomous mining drill rigs, each drill rig including:
      a wireless receiver for coupling the respective drill to a wireless communications network for receiving control signals, and
      a drill shutdown module for effecting shutoff of power to said drill rig;
   a remote control centre coupled to said wireless communications network, said remote control centre including:
      an interface for selecting a set of said plurality of autonomous mining drill rigs to be controlled by a drill controller; and
      a deactivation control adapted to send, when activated, a shutdown command to each drill rig in said selected set of autonomous mining drill rigs,
   wherein when each drill rig in said selected set of autonomous mining drill rigs receives said shutdown command, said drill shutdown module shuts off power to said drill rig, and
   wherein at least one of:
      (a) the drill shutdown module includes a switch coupled to an ignition of said drill rig,
      (b) the drill shutdown module adapted to cut fuel supply to said drill rig, and
      (c) the deactivation control includes an electromechanical switch.

11. The control system according to claim 10, wherein the plurality of autonomous mining drill rigs are autonomous blast hole drill rigs.

12. A method for remotely effecting a shutdown of a set of autonomous mining drill rigs, comprising the steps of:
   allocating the set of autonomous mining drill rigs to a deactivation control associated with a drill control station, the drill control station being coupled to each of said autonomous mining drill rigs via a communications network,
   wherein each autonomous drill rig includes a drill shutdown module adapted to shut off power to the respective drill rig,
   wherein activating said deactivation control sends a shutdown signal from said drill control station, via said communications network, to the drill shutdown module on each autonomous drill rig in said set of autonomous mining drill rigs,
   wherein each drill shutdown module shuts down power to the respective drill rig, on receipt of the shutdown signal, and
   wherein at least one of:
      (a) the drill shutdown module includes a switch coupled to an ignition of said drill rig,
      (b) the drill shutdown module is adapted to cut fuel supply to said drill rig, and
      (c) the deactivation control includes an electromechanical switch.

13. The method according to claim 12, wherein the set of autonomous mining drill rigs are autonomous blast hole drill rigs.

* * * * *